(12) United States Patent
Rice

(10) Patent No.: US 7,477,084 B2
(45) Date of Patent: Jan. 13, 2009

(54) MULTI-PHASE POWER SUPPLY CONTROLLER AND METHOD THEREFOR

(75) Inventor: Benjamin M. Rice, Attleboro, MA (US)

(73) Assignee: Semiconductor Components Industries, L.L.C., Phoenix, AZ (US)

( * ) Notice: Subject to any disclaimer, the term of this patent is extended or adjusted under 35 U.S.C. 154(b) by 297 days.

(21) Appl. No.: 11/286,979

(22) Filed: Nov. 28, 2005

(65) Prior Publication Data
US 2007/0132508 A1  Jun. 14, 2007

(51) Int. Cl.
*H03K 3/017* (2006.01)
(52) U.S. Cl. .................. 327/172; 327/176; 323/268; 323/271
(58) Field of Classification Search ......... 327/172–176, 327/31; 323/268, 271, 282, 283; 361/54, 361/56, 91.1, 91.5
See application file for complete search history.

(56) References Cited

U.S. PATENT DOCUMENTS

| 6,188,498 | B1 * | 2/2001 | Link et al. ................ 398/195 |
| 6,342,822 | B1 | 1/2002 | So |
| 6,404,251 | B1 | 6/2002 | Dwelley et al. |
| 6,674,325 | B2 * | 1/2004 | Chen et al. .............. 330/124 D |
| 7,138,788 | B2 * | 11/2006 | Rice .......................... 323/268 |
| 7,383,145 | B2 * | 6/2008 | Tabaian et al. ............. 702/106 |
| 2003/0223253 | A1 * | 12/2003 | Chen et al. ................... 363/65 |

* cited by examiner

*Primary Examiner*—An T Luu
(74) *Attorney, Agent, or Firm*—Robert P. Hightower

(57) ABSTRACT

In one embodiment, a power supply controller is configured to use a plurality of ramp signals to generate a plurality of PWM control signals.

18 Claims, 9 Drawing Sheets

US 7,477,084 B2

MULTI-PHASE POWER SUPPLY CONTROLLER AND METHOD THEREFOR

BACKGROUND OF THE INVENTION

The present invention relates, in general, to electronics, and more particularly, to methods of forming semiconductor devices and structure.

In the past, the electronics industry utilized various methods and structures to produce multi-phase power supply systems. A typical multi-phase power supply system divided a load of the power supply system into several regions. The power supply controller was also divided into a number of channels or phases. In some cases, each phase was assigned to a particular region of the load. The different phases had a power switch to provide switching of the input power. A pulse width modulator (PWM) circuit provided a variable duty cycle PWM signal to control the switching for each phase. All of the phases were summed together to generate a single output voltage. One problem with the prior controllers was offset errors and inaccuracies in the components within the controllers. The ability to equally share the load current between the channels or phases was affected by these and other variations in the respective PWM circuits and switches. For example, different PWM comparators may have different offsets that affected the PWM duty cycles and the resulting load currents, variations in the values of passive components such as ramp capacitors often resulted in different ramp slopes, and the ramps often had different offsets. Such differences affected the load currents. Thus, each channel and the associated passive and active components had to be sized to carry the maximum current value instead of an average current value. Increasing the current carrying potential of each channel increased the size of the power transistors, associated drivers, passive components, and other portions of system thereby increasing the costs of the power supply system.

Accordingly, it is desirable to have a method of forming a multi-phase power supply system and power supply controller that more equally distributes the load current between each of the phases or channels, that reduces the cost of the switches, and that reduces the costs of the passive components of the system.

For simplicity and clarity of illustration, elements in the figures are not necessarily to scale, and the same reference numbers in different figures denote the same elements. Additionally, descriptions and details of well-known steps and elements are omitted for simplicity of the description. As used herein current carrying electrode means an element of a device that carries current through the device such as a source or a drain of an MOS transistor or an emitter or a collector of a bipolar transistor or a cathode or anode of a diode, and a control electrode means an element of the device that controls current through the device such as a gate of an MOS transistor or a base of a bipolar transistor. Although the devices are explained herein as certain N-channel or P-Channel devices, a person of ordinary skill in the art will appreciate that complementary devices are also possible in accordance with the present invention. It will be appreciated by those skilled in the art that the words during, while, and when as used herein are not exact terms that mean an action takes place instantly upon an initiating action but that there may be some small but reasonable delay between the reaction that is initiated by the initial action.

DETAILED DESCRIPTION OF THE DRAWINGS

Figure 1:
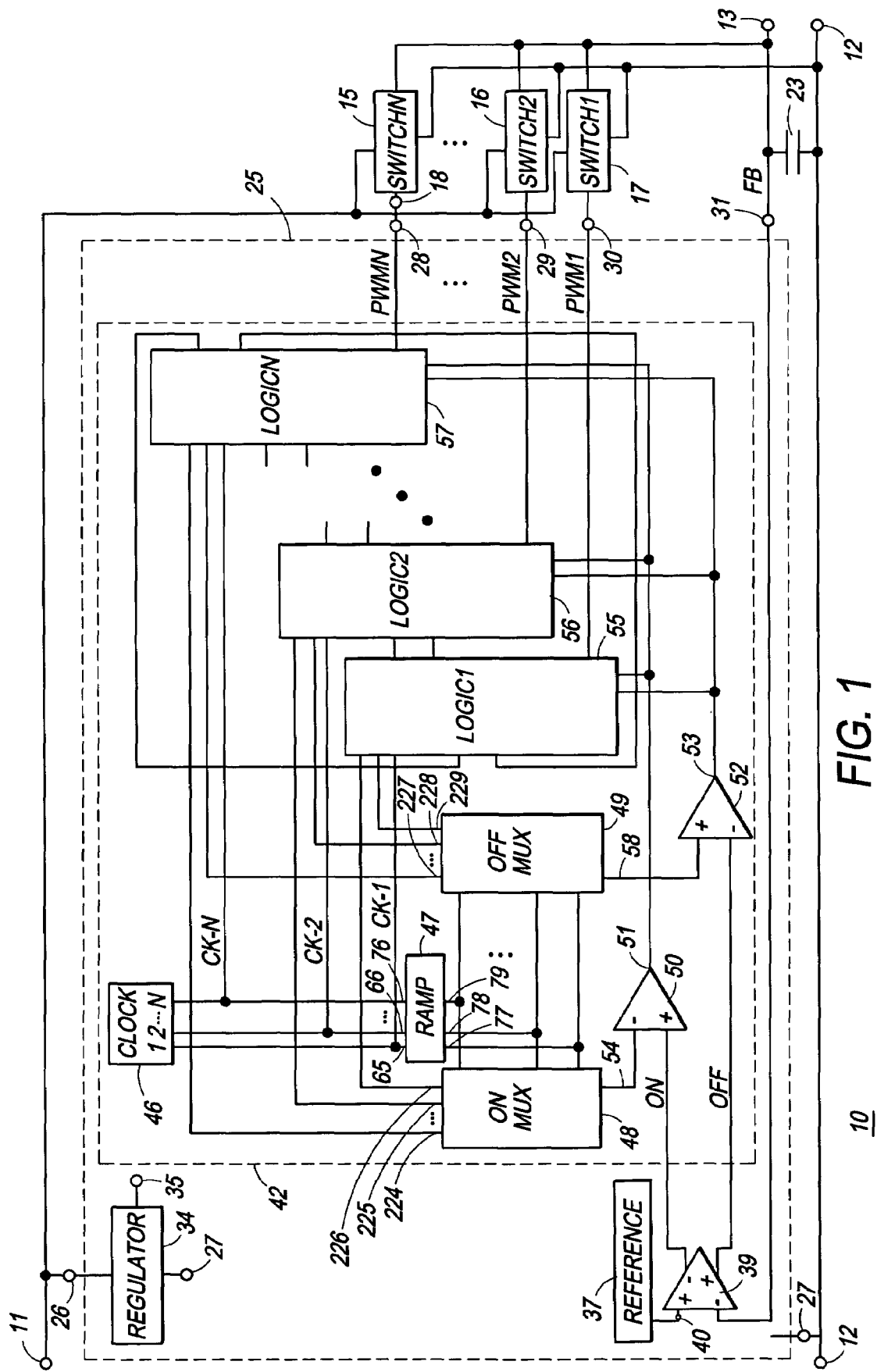
FIG. 1 schematically illustrates an embodiment of a portion of a power supply system having a power supply controller in accordance with the present invention.

FIG. 1 schematically illustrates an embodiment of a portion of a power supply control system 10 that includes an embodiment of a portion of a multi-phase switching power supply controller 25. System 10 receives power from an input voltage that is applied between a power input terminal 11 and a power return terminal 12 and responsively forms an output voltage between an output 13 and terminal 12. As will be seen further hereinafter, controller 25 includes a plurality of switching control channels that are utilized to form a plurality of switching control signals, such as a PWM control signal, to regulate the output voltage. In order to minimize the variations and offsets between the different switching control channels, controller 25 utilizes the same error amplifier and comparators for controlling each of the switching control channels. In addition to controller 25, system 10 also includes a plurality of switch stages that are controlled by the plurality of switching control signals. The number of switch stages generally is equal to the number of switching control channels. The plurality of switch stages includes a first switch stage or switch 17, a second switch stage or switch 16, and an Nth switch stage or switch 15. System 10 also generally includes a filter capacitor 23 that assists in minimizing ripple in the output voltage.

Figure 2:
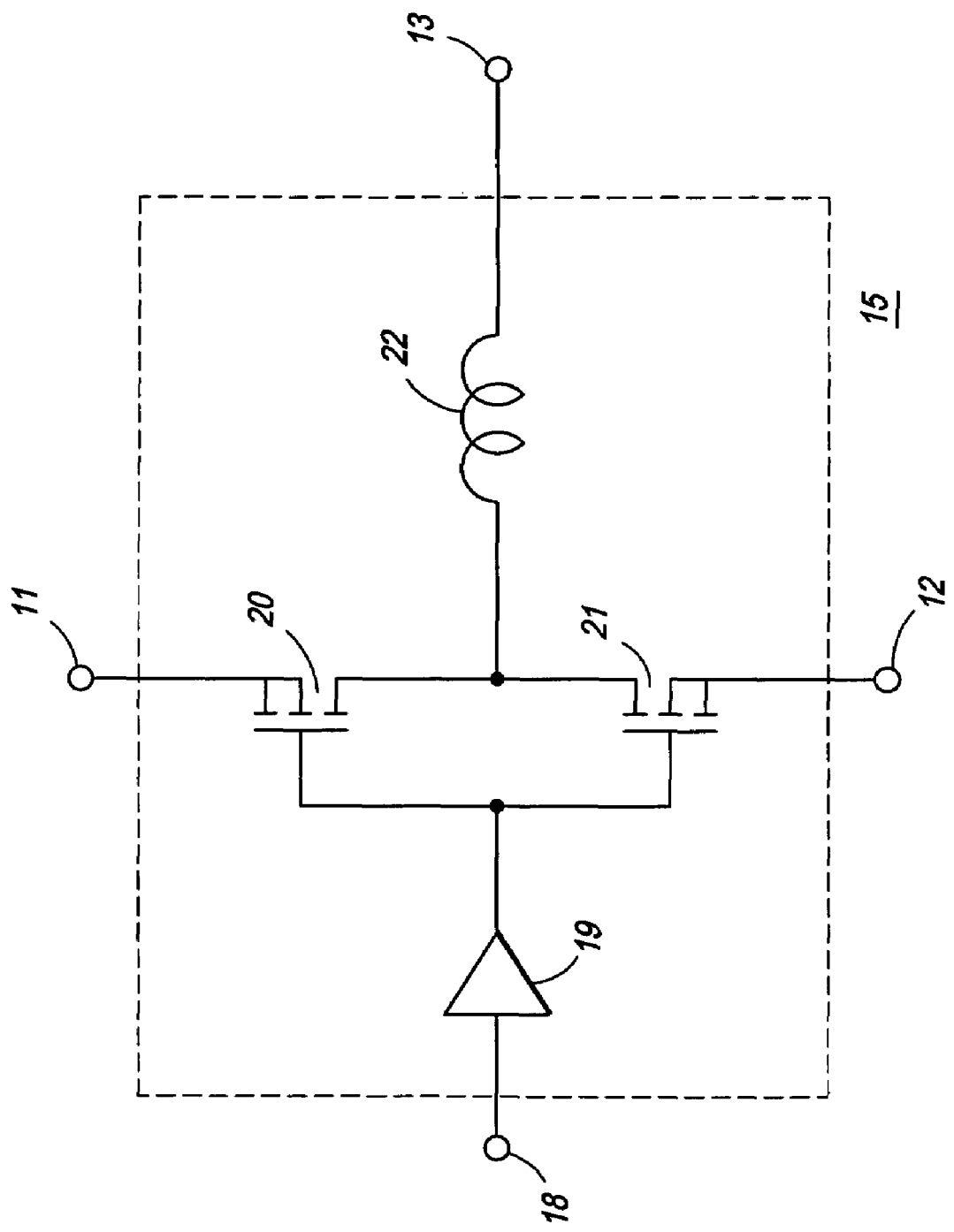
FIG. 2 schematically illustrates an embodiment of a portion of a power stage of the power supply system of FIG. 1 in accordance with the present invention.

FIG. 2 schematically illustrates an exemplary embodiment of switch 15. Switch 15 includes an input 18 that receives a switching control signal from controller 25, a driver 19, a P-channel power transistor 20, an N-channel power transistor 21, and an inductor 22. Such switch stages or switches are well known to those skilled in the art. Switches 16 and 17 generally are the same as switch 15.

Returning to FIG. 1, controller 25 receives power between a voltage input 26 and a voltage return 27. Return 27 typically is connected to terminal 12. Controller 25 also receives a feedback (FB) signal on a feedback (FB) input 31 that is representative of the value of the output voltage. In some embodiments, a feedback network may be used to form the FB signal from the output voltage. Such FB networks are well known to those skilled in the art. The FB signal may also be representative of a current instead of voltage or there may be multiple FB signals. Controller 25 usually includes a channel control section 42, a differential error amplifier 39, a reference generator or reference 37, and an internal regulator or regulator 34. Regulator 34 is connected between input 26 and return 27 to receive the input voltage and form an internal operating voltage on an output 35 that is utilized for powering elements of controller 25 such as reference 37, amplifier 39, or channel control section 42.

Differential error amplifier 39 is operably configured to receive the reference voltage from the output of reference 37 on input 40 and the feedback signal from input 31, and responsively form a differential error signal that includes an on-error signal on an inverting output and an off-error signal on a non-inverting output. Amplifier 39 is configured to form the on-error signal with a first polarity with respect to a common mode voltage of amplifier 39 and to form the off-error signal with a second polarity with respect to the common mode voltage. The polarity of the ON and off-error signals is opposite to each other relative to the common mode voltage. Hereinafter, such condition is referred to as the two signals being out-of-phase. Typically the magnitude of the gain of the ON and off-error signals is substantially the same but the gains may be different in some embodiments. Those skilled in the art will realize that due to component tolerances and other variations it is difficult to form the signals exactly one hundred eighty degrees out-of-phase, thus, the on-error signal and off-error signal may vary up to about plus or minus ten percent from exactly one hundred eighty degrees and still be considered substantially one hundred eighty degrees out-of-phase. Since amplifier 39 is a differential amplifier with differential outputs, the on-error signal and off-error signal vary around the common mode voltage of amplifier 39 responsively to the value of the reference voltage and the FB signal. The value of the common mode voltage is usually somewhere between the minimum and maximum value of the ramp signals that are discussed hereinafter. The value of the common mode voltage preferably is approximately equal to the average value of the ramp signals. Such differential error amplifiers are well known to those skilled in the art. Those skilled in the art realize that amplifier 39 typically includes a frequency compensation network that is not shown in FIG. 1 for clarity of the explanation.

Section 42 includes a plurality of control logic blocks with each control logic block configured to generate one switching control signal, such as a PWM control signal, of the plurality of switching control signals that are generated by controller 25. Each control logic block is a portion of each switching control channel or channel of section 42. The exemplary embodiment of section 42 illustrated in FIG. 1 includes N number of switching control channels and N number of PWM control logic blocks including a first PWM control logic block or logic 55, a second PWM control logic block or logic 56, and an Nth control PWM logic block or logic 57. Logic 55 generates a first switching control signal or PWM1 on an output 30, logic 56 generates a second switching control signal or PWM2 on an output 29, and logic 57 generates an Nth switching control signal or PWMN on an output 28. Section 42 also includes a multi-phase clock generator or clock 46, a multi-channel ramp generator or ramp 47, a multi-channel ON-multiplexer or ON-Mux or Mux 48, a multi-channel OFF-multiplexer or OFF-Mux or Mux 49, an ON-comparator or comparator 50, and an OFF-comparator or comparator 52.

Figure 3:
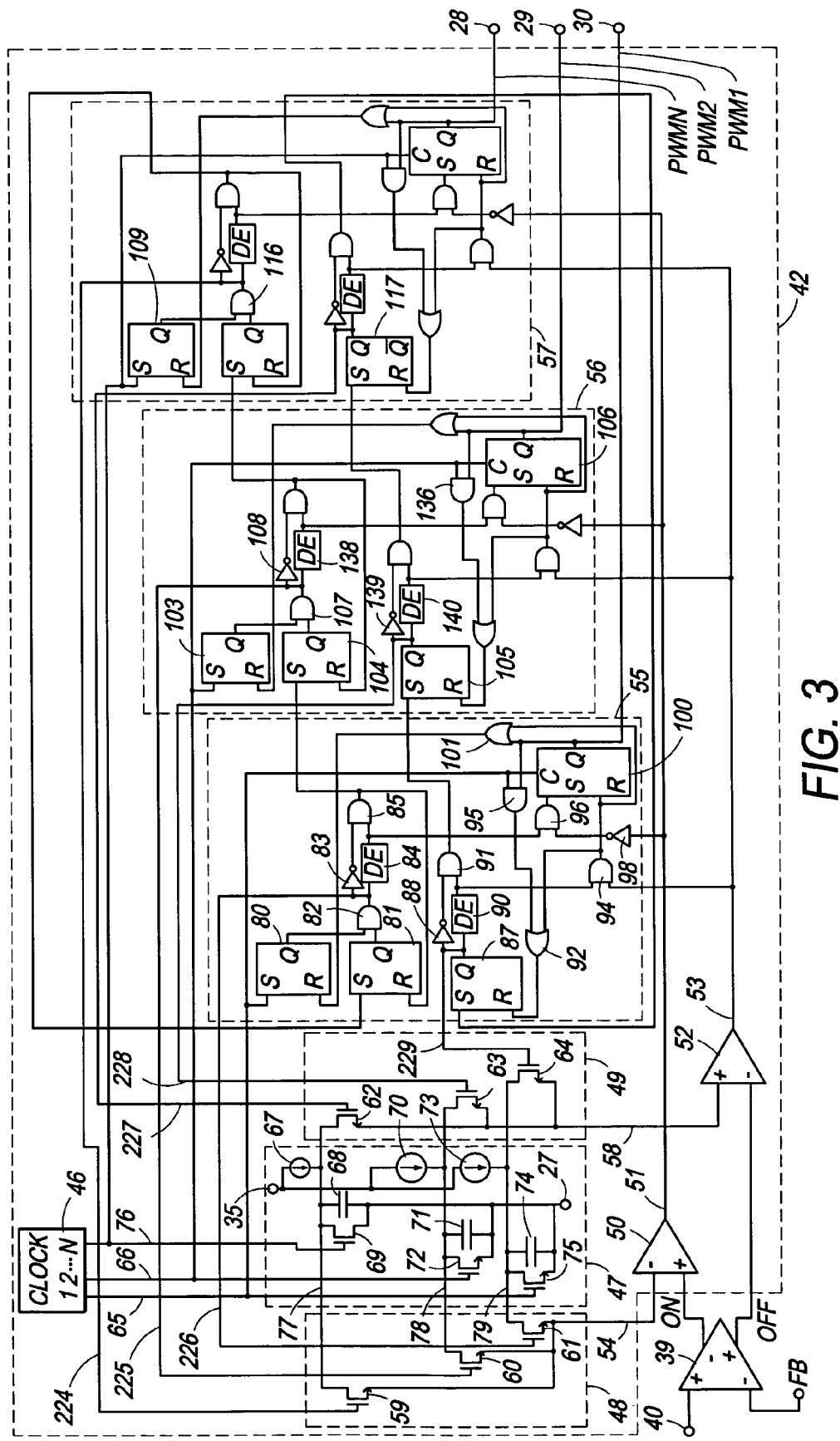
FIG. 3 schematically illustrates an embodiment of a portion of the power supply controller of FIG. 1 in accordance with the present invention.

FIG. 3 schematically illustrates a portion of an exemplary embodiment of section 42 that includes exemplary embodiments of ramp 47, Mux 48, Mux 49, and logics 55, 56, and 57.

Clock 46 generates a plurality of non-overlapping clock signals so that each channel of section 42 has a unique clock signal. The clock signals of clock 46 are referred to as clock one (CK-1), clock two (CK-2), and clock N (CK-N). Such non-overlapping clock generators are well known to those skilled in the art. Ramp 47 includes one ramp generator for each channel of section 42. The first ramp channel of ramp 47 receives CK-1 on an input 65 and includes a current source 73, a capacitor 74, and a discharge transistor 75. As is well known to those skilled in the art, current source 73 charges capacitor 74 in order to generate a ramp one signal or ramp one or ramp-1, and transistor 75 is enabled to discharge capacitor 74 and reset the ramp one signal or ramp one or ramp-1. Similarly, a second ramp channel receives CK-2 on an input 66 and includes a current source 70, a capacitor 71, and a discharge transistor 72 that forms a second ramp signal or ramp two or ramp-2. An Nth ramp channel receives CK-N on an input 76 and includes a current source 67, a capacitor 68, and a discharge transistor 69 that forms an Nth ramp signal or ramp N or ramp-N. Mux 48 and Mux 49 preferably are analog multiplexers that receive the analog ramp signals and multiplex them to comparators 50 and 52. Logics 55-57 control the selection of the ramps to comparators 50 and 52. Mux 48 includes a plurality of analog switches that are implemented as MOS transistors 59, 60, and 61. Mux 49 also includes a plurality of analog switches that are implemented as MOS transistors 62, 63, and 64.

Logic 55 includes a clock latch 80, an ON-token latch or latch 81, an OFF-token latch or latch 87, a PWM latch or latch 100, AND gates 82, 85, 91, 94, 95, and 96, OR gates 92 and 101, inverters 83, 88, and 98, and delay elements (DE) 84 and 90. Delay elements (DE) 84 and 90 are used along with respective inverters 83 and 88, and respective gates 85 and 91 to form negative edge detectors that generate a short pulse after receiving a negative edge of an input signal. The width of the pulse is approximately equal to amount of delay provided by the delay element. In the preferred embodiment, the amount of delay provided by delay elements (DE) 84 and 90 is approximately fifteen nano-seconds. Such delay elements and negative edge detectors are well known to those skilled in the art. The amount of delay may be different for different logic families or for a different amounts of delay through comparators 50 and 52.

Logic 56 and logic 57 are configured with logic elements that are similar to logic 55. However, because logic 55 is the first channel of section 42, logic 55 includes elements (not shown) to ensure that latches 81 and 87 are set at power on, and logics 56 and 57 have additional elements (not shown) that ensure that the corresponding latches of logic 56 and 57 are reset at power-on. Clock 46 also includes logic elements that force clock one (CK-1) through clock N (CK-N) high during the reset operation to ensure that all PWM latches of logics 55-57 are reset during power-on and all clock latches are set during power-on.

As will be seen further hereinafter, section 42 uses logical tokens that pass between each of logic 55, 56, and 57 in order to determine which channel is active and is used for regulating the value of the output voltage. Because there are two comparators, the channels of section 42 use two logical tokens. An ON-token assists in selecting which PWM latch is controlled by comparator 50 and an OFF-token assists in selecting which PWM latch is controlled by comparator 52. For example, latch 81 stores the ON-token for logic 55 and latch 87 stores the OFF-token for logic 55. Similarly, latch 104 stores the ON-token for logic 56 and latch 105 stores the OFF-token for logic 56. The channel having the ON-token controls Mux 48 to select the ramp signal corresponding to that channel to comparator 50. For example, if logic 56 has the ON-token then logic 56 controls Mux 48 to select ramp-2 to comparator 50. Similarly, the channel having the OFF-token controls Mux 49 to select the ramp signal corresponding to that channel to comparator 52. For example, if logic 57 has the OFF-token, then logic 57 controls Mux 49 to select ramp-N to comparator 52.

When the ON-token or the OFF-token is passed from one channel to the next channel, the ramp that corresponds to the next channel is coupled to the input of respective comparator 50 or comparator 52. So there is always a correspondence between the channel that is controlling the initiation of a PWM signal and the ramp that is applied to comparator 50 and a correspondence between the PWM channel that is controlling the termination of a PWM signal and the ramp that is applied to comparator 52. The output of gate 85 is used to pass the ON-token from logic 55 to the next channel. If the output of gate 85 goes high, logic 55 sets latch 104 thereby passing the ON-token to the next channel and also resets latch 81 so that logic 55 no longer has the ON-token. Logic 55 passes the ON-token to the next channel when PWM latch 100 becomes set or if logic 55 has the OFF-token and comparator 52 is triggered. Similarly, latch 87 holds the OFF-token for logic 55 and latch 105 holds the OFF-token for logic 56. When the Q output of latch 87 is high, logic 55 has the OFF-token and is controlling which ramp signal is applied to comparator 52 by controlling the operation of OFF-Mux 49. The output of gate 91 is used to pass the OFF-token from logic 55 to the next channel. If the output of gate 91 goes high, logic 55 sets latch 105 thereby passing the OFF-token to the next channel. Logic 55 passes the OFF-token to the next channel if comparator 52 is triggered or if CK-1 goes high and PWM latch 100 is set.

Figure 4:
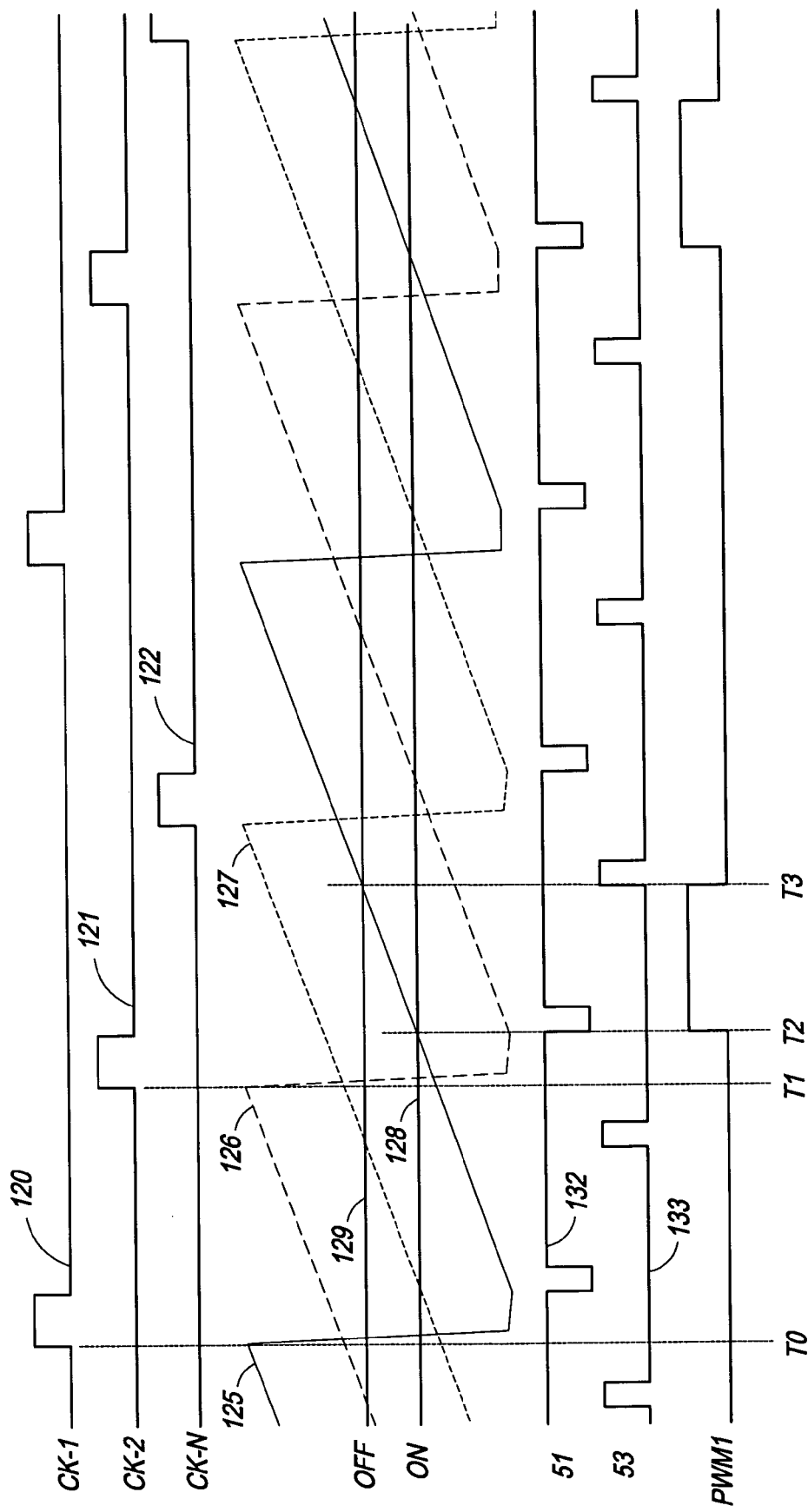
FIG. 4 is a graph having plots of various signals of the power supply controller of FIG. 1 in accordance with the present invention.

FIG. 4 is a graph having plots that illustrate some of the signals of controller 25 during the operation of section 42. The abscissa indicates time and the ordinate indicates increasing value of the illustrated signal. A plot 120 illustrates CK-1, a plot 121 illustrates a CK-2, and a plot 122 illustrates CK-N. A plot 125 illustrates ramp-1, a plot 126 illustrates ramp-2, and a plot 127 illustrates ramp-N. A plot 128 illustrates the on-error output of amplifier 39 and a plot 129 illustrates the off-error output of amplifier 39. A plot 132 illustrates an output 51 of comparator 50, a plot 133 illustrates an output 53 of comparator 52, and a plot 134 illustrates the switching control signal on output 30. This description has references to FIG. 1 through FIG. 4.

In operation and assuming that latches 81 and 87 are set at power-on as described hereinbefore, at a time T0 CK-1 goes high while CK-2 through CK-N are low. The high from CK-1 initiates the generation of ramp-1 by enabling transistor 75 to reset ramp-1 to a low. When CK-1 goes low, transistor 75 is disabled and current source 73 begins charging capacitor 74 to generate ramp-1. The high from CK-1 also sets clock latch 80 and clears PWM latch 100. Since the Q output of latch 81 is already high, logic 55 has the ON-token and is controlling which ramp signal is applied to comparator 50 by controlling the operation of ON-Mux 48. The high from latches 80 and 81 forces the output of gate 82 high. The high from gate 82 enables transistor 61 of Mux 48 to select ramp-1 to the inverting input of comparator 50 through an output 54 of Mux 48. The high from gate 82 also forces the output of gate 85 low through inverter 83 so that logic 55 does not pass the ON-token to logic 56. The high from latch 87 enables transistor 64 of Mux 49 to select ramp-1 to the non-inverting input of comparator 52 through an output 58 of Mux 49. The high from latch 87 also forces the output of gate 91 low through inverter 88 so that logic 55 does not pass the OFF-token to logic 56.

Logic 55 remains in this state until either output 51 of comparator 50 goes low to initiate a PWM1 signal or until output 53 of comparator 52 goes high to pass the tokens to the next channel. The signal on outputs 51 and 53 is often referred to as PWM modulator signal because it represents the error signal modulated by one of the ramp signals. If another CK-1 pulse appears without comparator 52 triggering and forcing output 53 high, logic 55 retains both the ON-token and the OFF-token and waits for either output 51 to go low or output 53 to go high.

If the value of the output voltage is very high, the ON output of amplifier 39 may also be very high and the OFF output of amplifier 39 may be very low. Thus, ramp-1 crosses the value of the off-error signal prior to crossing the on-error signal which forces output 53 high. The high on output 53 forces the output of gate 94 high which has no effect on latch 100 which is already reset. The high from gate 94 also forces the output of gate 92 high which resets latch 87. The low from the Q output of latch 87 forces the edge detector to generate a positive going pulse on the output of gate 91 to set latch 105 thereby passing the OFF-token to logic 56. The low from latch 87 also disables transistor 64 to remove ramp-1 from the positive input of comparator 52, however, the high from latch 105 enables transistor 63 to couple ramp-2 to the positive input of comparator 52. The value of the next ramp is always lower than the one previously used. Thus, the value of ramp-2 is lower than ramp-1 at the time that the OFF-token is passed, thus, the output of comparator 52 will be forced low when the ramps are switched. The high from gate 94 also forces the output of gate 101 high to reset clock latch 80. The low from latch 80 forces the output of gate 82 low causing the edge detector to generate a positive pulse from gate 85 and set ON-token latch 104. The positive pulse also resets latch 81 which disables transistor 61 and decouples ramp-1 from comparator 50. However, the high from latch 104 enables transistor 60, through gate 107, to couple ramp-2 to comparator 50. Thus, logic 55 has passed the ON-token and the OFF-token to logic 56. Logic 56 remains in that state until comparator 50 goes low to initiate a PWM2 signal or until comparator 52 goes high to pass the tokens to the next channel. The low from latch 87 also forces the output of gate 94 low thereby preventing the next positive output of comparator 52 from resetting latch 100. Note that the input to gate 94 is taken from delay element 90 to avoid race conditions.

If the value of the output voltage is low, the on-error signal from amplifier 39 will be less than the off-error signal. This indicates that the active channel should "turn on" the PWM signal. For such a condition, ramp-1 will cross the value of the on-error signal prior to crossing the value of the off-error signal and force output 51 low as illustrated at a time T2. The low from output 51 forces the output of inverter 98 high thereby setting latch 100 and forcing the PWM1 signal on output 30 high. The high from latch 100 also forces the output of gate 101 high thereby resetting latch 80. The low from latch 80 forces the output of gate 82 low thereby triggering the edge detector and generating a positive going pulse on the output of gate 85 to set latch 104 and pass the ON-token to logic 56. The low from gate 82 also forces the output of gate 96 low, after the delay of delay element 84, thereby preventing another transition of comparator 50 from setting latch 100. The pulse from gate 85 also resets latch 81 which disables transistor 61 thereby decoupling ramp-1 from comparator 50, however, latch 100 remains set and PWM1 remains high. The high from latch 104 enables transistor 60 to couple ramp-2 to comparator 50. If the value of the output voltage remains low, the previous CK-2 pulse will have ensured that latch 106 is cleared and that clock latch 103 of logic 56 is set, thus, logic 56 is enabled to generate a PWM2 control signal that is active along with the PWM1 control signal. If ramp-2 crosses the on-error signal, output 51 of comparator 50 again goes low and sets latch 106 of logic 56 and forces PWM2 on output 29 high. Note that the high from latch 106 resets latch 103.

Latch 87 remains set until either the output of comparator 52 goes high or another CK-1 pulse is generated which clears latches 87 and 100. If the value of ramp-1 continues to increase and crosses the off-error signal, output 53 is forced high. The high from output 53 forces the output of gate 94 high to reset latch 100 and force PWM1 low at time T3. The high from gate 94 also forces the output of gate 92 high to reset latch 87. The low from latch 87 forces the edge detector to generate a positive going pulse on the output of gate 91 thereby passing the OFF-token to logic 56. The low from latch 87 also disables transistor 64 to remove ramp-1 from the positive input of comparator 52, however, the high from latch 105 enables transistor 63 to couple ramp-2 to the positive input of comparator 52. The low from latch 87 also forces the output of gate 94 low thereby preventing the next positive output of comparator 52 from resetting latch 100. The low also prevents latch 100 from being reset for all triggers of comparator 52 until logic 55 receives an OFF-token.

At a time T1, CK-2 goes high to initiate the generation of ramp-2 as illustrated by plots 121 and 126. The high from CK-2 enables transistor 72 and resets ramp-2 to a low. When CK-2 goes low, transistor 72 is disabled and current source 70 begins charging capacitor 71 to generate ramp-2. Note that ramp-2 is always initiated prior to the previous ramp-1 being terminated. If logic 56 has the ON-token as indicated by latch 104 being set, logic 56 may assert PWM2 while PWM1 is still asserted.

The operation continues for each successive clock signal. The logic block that has the ON-token asserts the corresponding PWM signal if it receives a signal from on comparator 50 and then passes the ON-token to the next logic block. The logic block that has the OFF-token negates the corresponding PWM signal if it receives a signal from comparator 52 and then passes the OFF-token to the next logic block. Thus the ON-token facilitates asserting a PWM signal for a period of time and the OFF-token facilitates negating the PWM signal and terminating the period of time. Thus, it can be seen that logic 55 is configured to selectively use the on-error signal to control PWM1 for a first time period and that logic 56 is configured to selectively use the on-error signal to control PWM2 for a second time period and that the first and second time periods may overlap.

In order to implement this functionality for controller 25, regulator 34 is coupled to receive power between input 26 and return 27. An inverting input of amplifier 39 is connected to receive the feedback signal from input 31 and non-inverting input 40 is connected to receive the reference signal from reference 37. An inverting output of amplifier 39 is connected to a non-inverting input of comparator 50 and a non-inverting output of amplifier 39 is connected to an inverting input of comparator 52. An inverting input of comparator 50 is connected to a source of transistors 59, 60, and 61. A drain of transistor 61 is commonly connected to an output 79 of ramp-1, a drain of transistor 75, a first terminal of capacitor 74, an output of source 73, and a drain of transistor 64. A source of transistor 75 is commonly connected to a second terminal of capacitor 74 and return 27. A gate of transistor 75 is commonly connected to a CK-1 output of clock 46, the set input of latch 80, a clear input of latch 100, and a first input of gate 95. A gate of transistor 61 is commonly connected to an input 226 of ON-Mux 48, an output of gate 82, an input of inverter 83, and an input of delay element 84. A drain of transistor 60 is commonly connected to an output 78 of ramp-2, a drain of transistor 72, a first terminal of capacitor 71, an output of source 70, and a drain of transistor 63. A source of transistor 72 is commonly connected to a second terminal of capacitor 71 and return 27. A gate of transistor 72 is commonly connected to a CK-2 output of clock 46, a set input of latch 103, a clear input of latch 106, and an input of an AND gate 136. A gate of transistor 60 is commonly connected to an input 225 of ON-Mux 48, an output of gate 107, an input of inverter 108, and an input of a delay element 138. A drain of transistor 59 is commonly connected to an output 77 of ramp-3, a drain of transistor 69, a first terminal of capacitor 68, an output of source 67, and a drain of transistor 62. A gate of transistor 59 is connected to an input 224 of ON-Mux 48 and to a Q output of a latch 117 of logic 57. A source of transistor 69 is commonly connected to a second terminal of capacitor 68 and return 27. A gate of transistor 69 is connected to the CK-N output of clock 46 and to a set input of a latch 109 of logic 57. A non-inverting input of comparator 52 is commonly connected to a source of transistor 64, a source of transistor 63, and a source of transistor 62. A gate of transistor 62 is connected to an input 227 of OFF-Mux 49 and to an output of an AND gate 116 of logic 57. A gate of transistor 64 is commonly connected to an input 229 of OFF-Mux 49, the Q output of latch 87, an input of inverter 88, and an input of delay element 90. A gate of transistor 63 is commonly connected to an input 228 of OFF-Mux 49, a Q output of latch 105, an input of inverter 139, and an input of delay element 140. An input of sources 73, 70, and 67 are connected to output 35 of regulator 34 (FIG. 1). The Q output of latch 80 is connected to an input of gate 82. The Q output of latch 81 is connected to a second input of gate 82. A set input of latch 81 is connected to receive the ON-token from logic 57. The output of inverter 83 is connected to an input of gate 85. The output of element 84 is commonly connected to a second input of gate 85 and a first input of gate 96. The output of gate 85 is commonly connected to the reset input of latch 81 and the set input of latch 104. The reset input of latch 80 is connected to the output of gate 101. A first input of gate 101 is commonly connected to a second input of gate 95, the Q output of latch 100, and output 30. A second input of gate 101 is commonly connected to the reset input of latch 100, the output of gate 94, and a first input of gate 92. The set input of latch 100 is connected to the output of gate 96. A second input of gate 96 is connected to the output of inverter 98 which has an input connected to output 51 of comparator 50. A second input of gate 92 is connected to the output of gate 95. The output of gate 92 is connected to the reset input of latch 87. The set input of latch 87 is connected to receive the OFF-token from logic 57. The output of inverter 88 is connected to a first input of gate 91. The second input of gate 91 is commonly connected to an output of element 90 and the first input of gate 94. A second input of gate 94 is connected to output 53 of comparator 52. The output of gate 91 is connected to the set input of latch 105.

Figure 5:
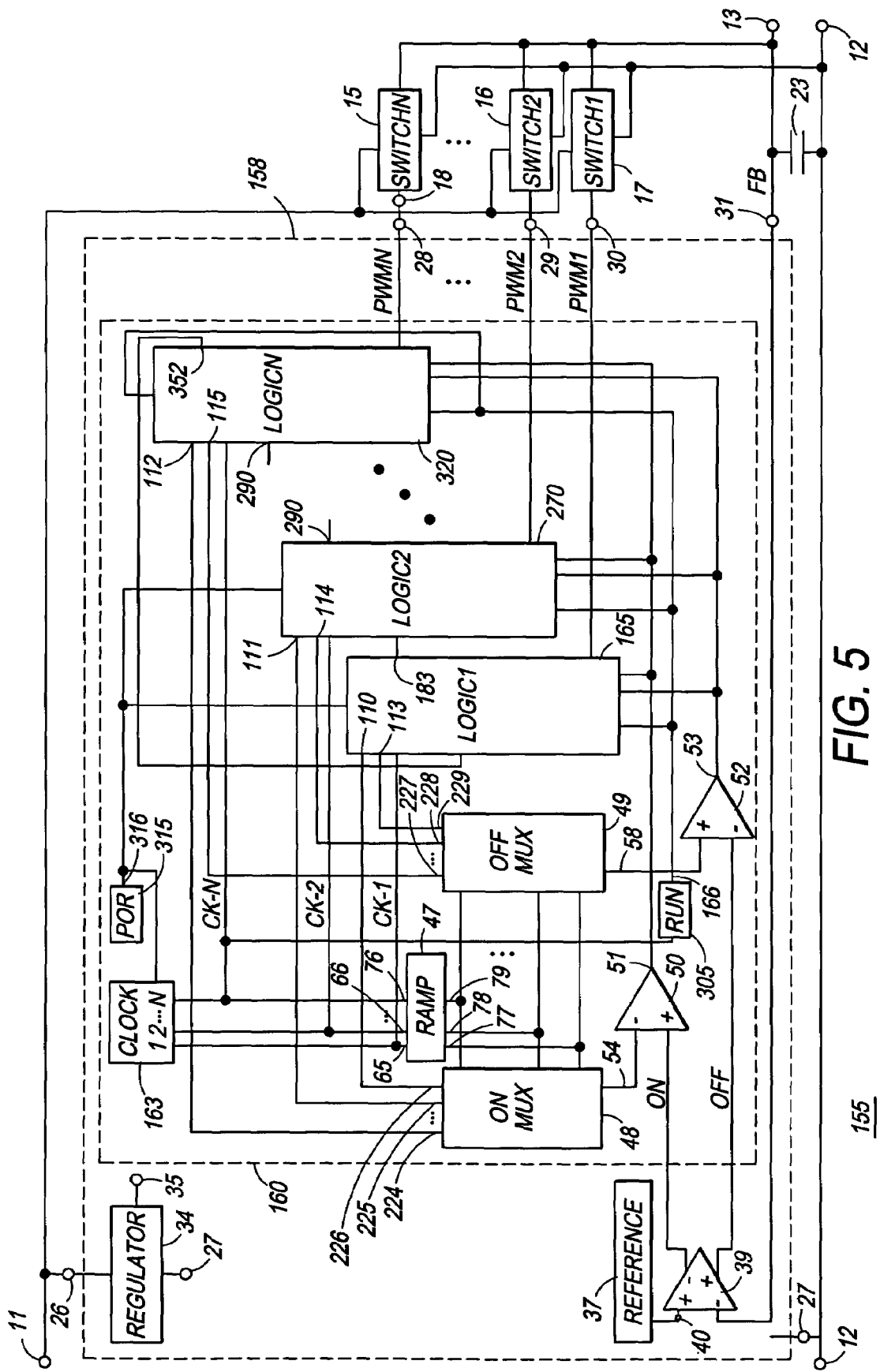
FIG. 5 schematically illustrates an embodiment of a portion of another power supply system having another power supply controller in accordance with the present invention.

FIG. 5 schematically illustrates an embodiment of a portion of a power supply control system 155 that is an alternate embodiment of system 10 explained in the description of FIGS. 1-4. System 155 includes an embodiment of a portion of a multi-phase switching power supply controller 158 that is an alternate embodiment of controller 25. Controller 158 includes a channel control section 160 that is an alternate embodiment of section 42 explained in the description of FIGS. 1-4.

The exemplary embodiment of section 160 illustrated in FIG. 5 includes N number of switching control channels and N number of PWM control logic blocks including a first PWM control logic block or logic 165, a second PWM control logic block or logic 270, and an Nth PWM control logic block or logic 320. Logic 165 generates PWM1 on output 30, logic 270 generates PWM2 on output 29, and logic 320 generates PWMN on output 28. Section 160 also includes a multi-phase clock generator or clock 163, a power-on reset circuit or POR 315 and a run detection circuit or run 305. POR 315 is configured to detect that the operating voltage from regulator 34 has reached a desired operating voltage value and a POR signal 316 from an output of POR 315 goes low. Run 305 has a run signal 166 that is initially low and transitions to a high some time period after POR signal 316 transitions low. This extra time period allows logic 165, 270, and 320 to transition to a stable operating condition prior to releasing all of system 155 to begin operation. The length of the extra time period is determined by the number of channels within the system. This stable operating condition could also be forced by additional logic without an extra time period but would delay the response of the logic response during normal operation. In order to minimize this delay during normal operation, a longer delay is used during the start-up procedure. Clock 163 generates a plurality of non-overlapping clock signals so that each channel of section 160 has a unique clock signal. The clock signals of clock 163 are referred to as clock one (CK-1), clock two (CK-2), and clock N (CK-N). Such non-overlapping clock generators are well known to those skilled in the art.

The N number of logic blocks are not all identical to each other. The internal logic of all the logic blocks are the same except for the first logic block which is different from the internal logic of all other logic blocks of the plurality of logic blocks. However, the Nth logic block does not receive POR signal 316 that is received by the other remaining logic blocks. The differences generally are to ensure proper initialization of the logic blocks. All of the remaining logic blocks generally use identical logic elements and structure and typically are configured similarly to logic 270. If there are only two channels or two logic blocks, the first logic block usually is configured similar to logic 165 and the second logic block is configured similar to logic 320.

Figure 6:
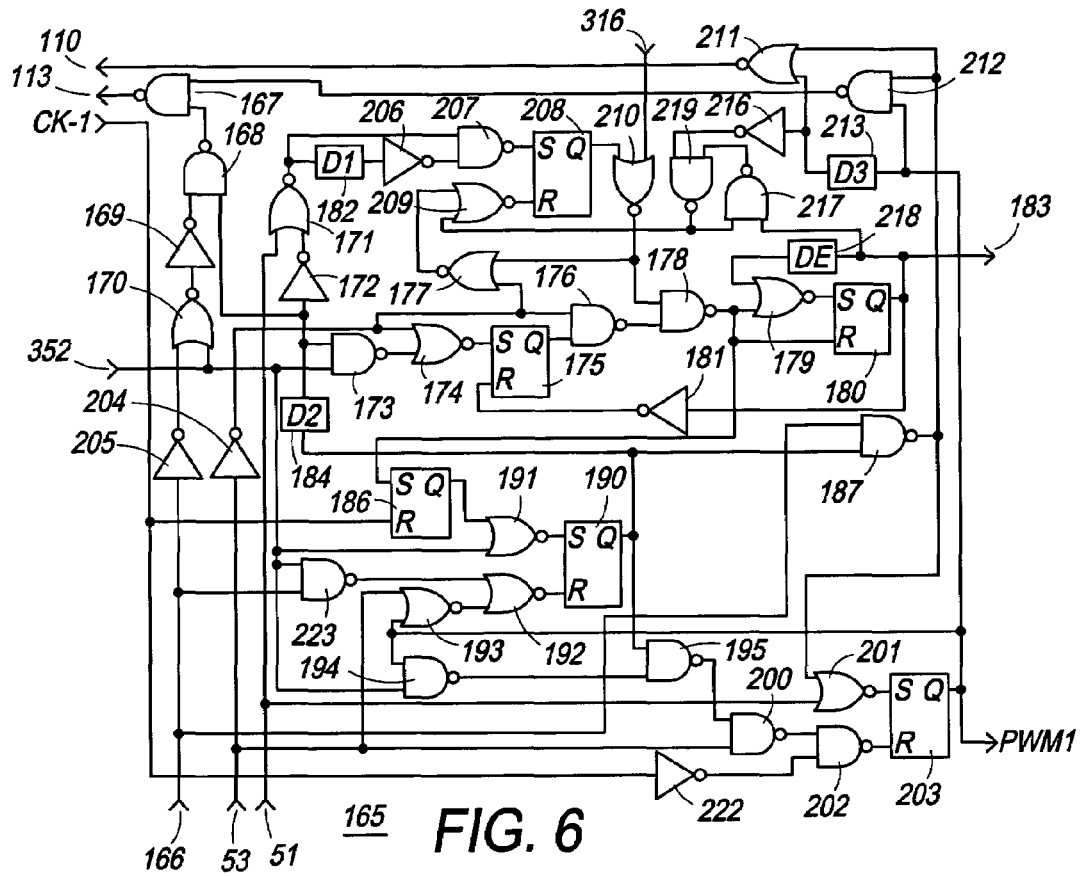
FIG. 6 schematically illustrates an embodiment of a first portion of the power supply controller of FIG. 5 in accordance with the present invention.

FIG. 6 schematically illustrates an exemplary embodiment of a portion of logic 165.

Figure 7:
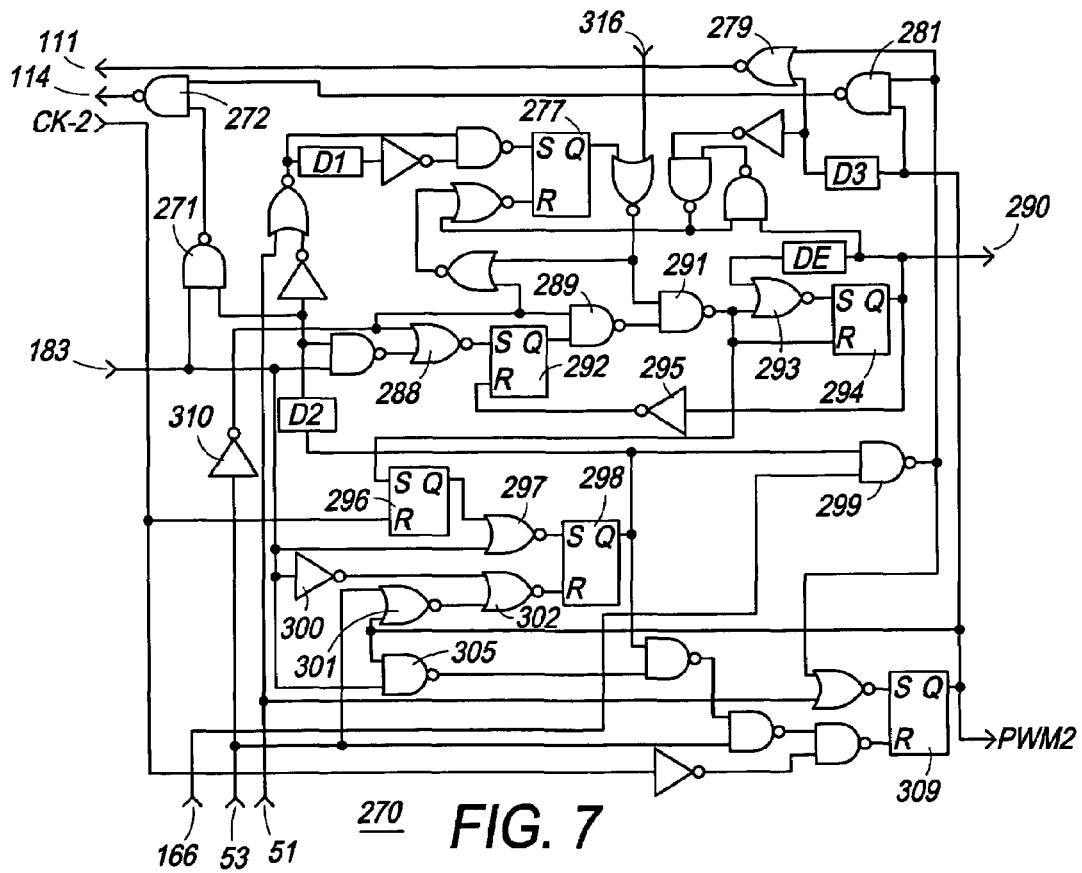
FIG. 7 schematically illustrates an embodiment of a second portion of the power supply controller of FIG. 5 in accordance with the present invention.

FIG. 7 schematically illustrates an exemplary embodiment of a portion of logic 270.

Figure 8:
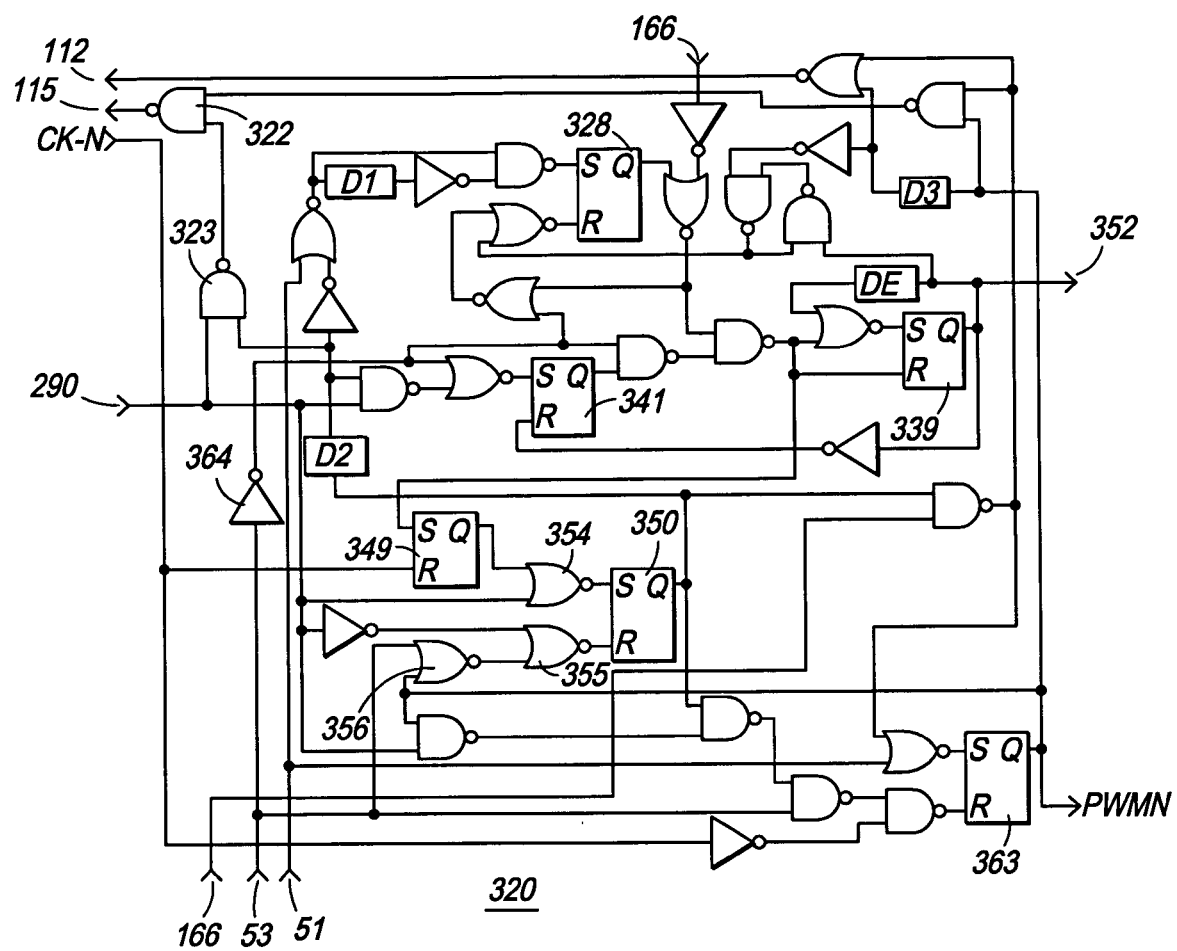
FIG. 8 schematically illustrates an embodiment of a third portion of the power supply controller of FIG. 5 in accordance with the present invention.

FIG. 8 schematically illustrates an exemplary embodiment of a portion of logic 320. This description has references to FIG. 5 through FIG. 8. For the exemplary embodiment illustrated in FIG. 6, logic 165 includes NAND gates 167, 168, 207, 219, 217, 212, 173, 176, 178, 187, 223, 194, 195, 200, and 202, NOR gates 211, 209, 171, 210, 170, 177, 179, 174, 191, 192, 193, and 201, inverters 204, 205, 206, 216, 169, 172, 181, and 222, delay element or DE 218, delay element one or D1 182, delay element two or D2 184, delay element three or D3 213, latches 208, 175, 186, 180, 190, and a PWM latch 203. DE 218 is similar to element 84 in FIG. 3. D1 182, D2 184, and D3 213 are similar to DE 218 but have different delay times of approximately fifty five nsec., ten nsec., and fifteen nsec., respectively. All of the latches within logics 165, 270, and 320 are reset dominant latches.

The logical elements of logic 270 are the same as logic 165 except that a NAND gate 271 functions for similar NAND gate 168 of logic 165. Also, inverters 169 and 205 and NOR gate 170 of logic 165 are omitted and the corresponding input of NAND gate 271 is connected to receive token signal 183. Additionally, a NOR gate 302 functions for NOR gate 192 of logic 165. Also, NAND gate 223 of logic 165 is omitted and the corresponding input of gate 302 is connected to receive run signal 166 through an inverter 300.

The logic elements of logic 320 are identical to the logic elements of logic 270. Note that the input of logic 270 that is connected to receive POR signal 316 is connected to receive run signal 166 in logic 320.

As will be seen further hereinafter, section 160 uses logical tokens that pass between each of logic 165, 270, and 320 in order to determine which switching control channel is active and is used for regulating the value of the output voltage. Because there are two comparators, the switching control channels of section 160 use two logical tokens. An ON-token assists in selecting which control logic block, thus which PWM latch, is controlled by comparator 50 and an OFF-token assists in selecting which PWM latch is controlled by comparator 52. Both tokens are passed as a single signal referred to as the token signal on a single signal line referred to as the token line. A negative transition of the token signal passes the ON-token and a positive transition passes the OFF-token. Each channel stores the state of having the ON-token and the OFF-token as the state of several latches. Latch 190 or 298 or 350 being set indicates that the corresponding logic block has the ON-token. Latches 203 or 190, 309 or 298, or 363 or 350 being set indicates that the corresponding logic block has the OFF-token if a high level is present at the corresponding token input. The channel having the ON-token controls Mux 48 to select the ramp signal corresponding to that channel to comparator 50. Similarly, the channel having the OFF-token controls Mux 49 to select the ramp signal corresponding to that channel to comparator 52.

When the ON-token or the OFF-token is passed from one channel to the next channel, the ramp that corresponds to the next channel is coupled to the input of respective comparator 50 or comparator 52. So there is always a correspondence between the channel that is controlling the initiation of a PWM signal and the ramp coupled to the inverting input of comparator 50 and a correspondence between the PWM channel that is controlling the termination of a PWM signal and the ramp coupled to the non-inverting input of comparator 52. When the Q output of latch 190 is high, logic 165 has the ON-token and is controlling which ramp signal is applied to comparator 50 by controlling the operation of ON-Mux 48. The output of latch 180 is used to pass the token from logic 165 to the next channel. If, in response to a low from comparator 50, the output of latch 180 goes low, the low from latch 180 sets latch 298 of logic 270 thereby passing the ON-token to the next channel and logic 165 also resets latch 190. Logic 165 passes the ON-token to the next channel upon setting PWM latch 203 or if PWM latch 203 is reset, logic 165 has the OFF-token, and the output of comparator 52 goes high. If, in response to a high from comparator 52, the output of latch 180 goes high, the high from latch 180 is received as the OFF-token by logic 270 if latch 298 or latch 309 of logic 270 are set thereby passing the OFF-token to the next channel. Logic 165 passes the OFF-token to the next channel if comparator 52 is triggered or if CK-1 goes high and PWM latch 203 is set. Latches 294, 309, and 298 of logic 270 operate similarly to respective latches 180, 203, and 190 of logic 165 to pass the ON and OFF tokens to the next channel. Also, latches 339, 363, and 350 of logic 320 operate similarly to respective latches 180, 203, and 190 of logic 165 to pass the ON and OFF tokens to the next channel.

Figure 9:
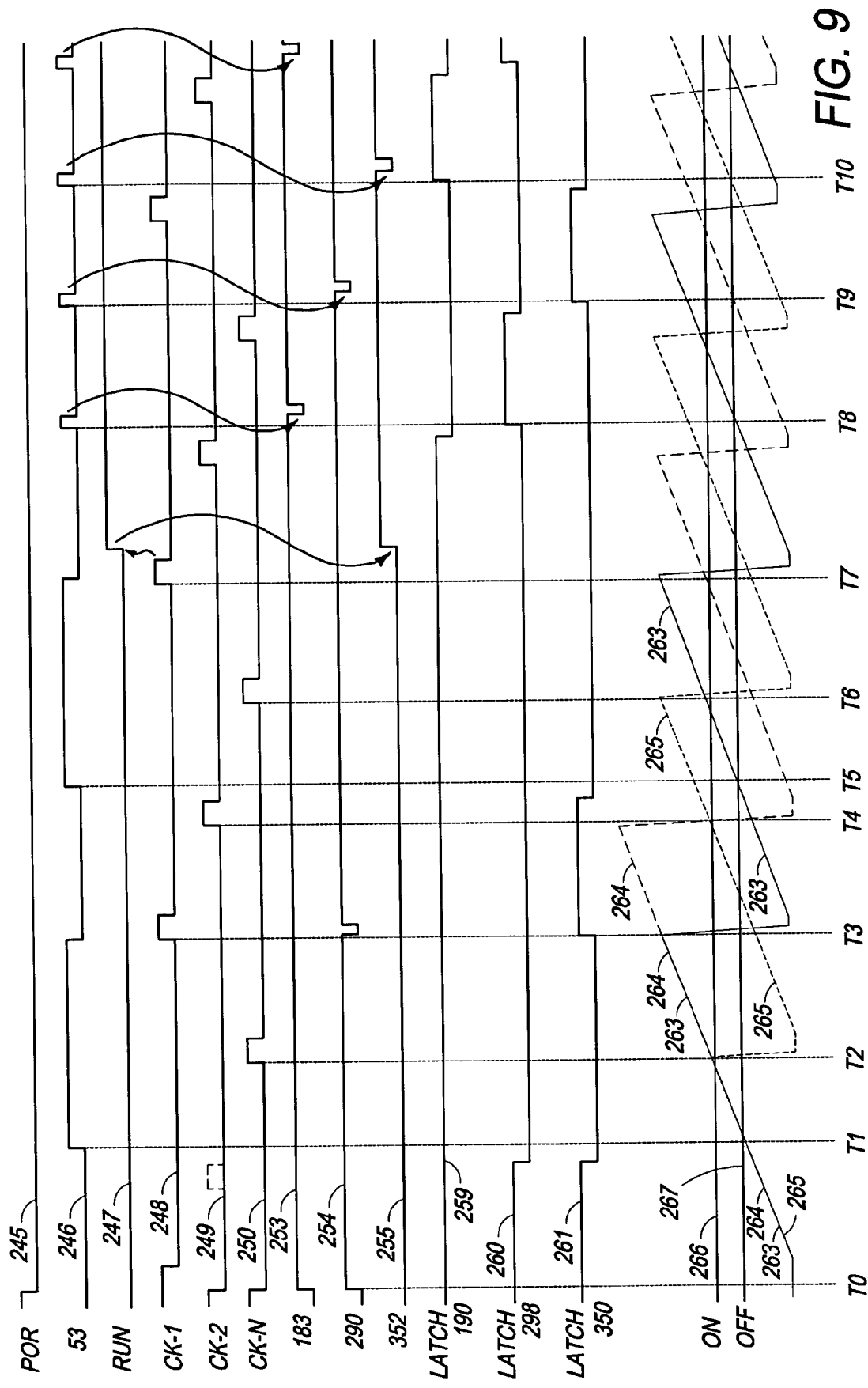
FIG. 9 is a graph having plots of various signals of the power supply controller of FIG. 5 in accordance with the present invention.

FIG. 9 is a graph having plots that illustrate some of the signals of controller 158 during the operation of section 160. The abscissa indicates time and the ordinate indicates increasing value of the illustrated signal. A plot 245 illustrates POR signal 316 from POR 315 and a plot 246 illustrates output 53 of comparator 52. A plot 247 illustrates run signal 166. A plot 248 illustrates CK-1, a plot 249 illustrates CK-2, and a plot 250 illustrates CK-N. A plot 253 illustrates a token signal 183 from logic 165, a plot 254 illustrates a token signal 290 from logic 270, and a plot 255 illustrates a token signal 352 from logic 320. A plot 259 illustrates the output of latch 190 of logic 165, a plot 260 illustrates the output of latch 298 from logic 270, and a plot 261 illustrates the output of a latch 350 from logic 320. A plot 263 illustrates ramp-1, a plot 264 illustrates ramp-2, and a plot 265 illustrates ramp-N. A plot 266 illustrates the on-error signal of amplifier 39 and a plot 267 illustrates the off-error signal of amplifier 39. This description has references to FIG. 5 through FIG. 9.

The power-on sequence and initialization for section 160 is different from the initialization sequence of section 42 (FIG. 1). One function of the power-on sequence and initialization for section 160 is to sequence the control logic to remove excess tokens resulting from random logic states that may be set as power is applied. During normal operation, there should be one ON-token and one OFF-token. As will be seen further hereinafter, when power is initially applied, the POR signal 316 is high and run signal 166 of run 305 is low. During the power up sequencing while POR signal 316 is high, clock 163 holds all of the clock signals high. Since all the clock signals are high, all of ramps 47 are reset thereby forcing the output of comparator 50 high and the output of comparator 52 low. The high clock signals and low ramp signals assist in initializing logics 165, 270, and 320 to certain states. In order to complete the proper initialization of logics 165, 270, and 320, after the output of POR 315 goes low clock 163 begins to sequence through one complete cycle of the N clock signals but holds the outputs of the clock signals low until time to generate the last clock signal of this first cycle of the clock signals. As the last clock signal in this first sequence of clock signals goes high, clock 163 begins generating all of the multi-phase clock signals. This sequencing of the clock signals is illustrated by plots 248, 249, and 250 between times T0 and T2. Section 160 is formed to initialize logic 165 to have the ON-token and the OFF-token and logic 270 and 320 are initialized to an idle mode waiting to receive a token.

Prior to time T0, power is applied, all of the clock signals of clock 163 are high, POR signal 316 is high, and run signal 166 is low. Logic 165 receives the high from POR signal 316 and forces the output of gate 210 low. The low from gate 210 forces the output of gate 178 high which resets latch 180. The high from gate 178 does not set latch 186 due to the presence of CK-1. The low from latch 180 ensures that token signal 183 is low so that latch 298 of logic 270 is set. The low from latch 180 also forces the output of inverter 181 high thereby resetting latch 175. Since CK-1 is high, inverter 222 is low which forces a high reset signal to PWM latch 203 through gate 202 thereby ensuring that PWM1 is low. The low from latch 180 forces the output of gate 217 high and the low from latch 203 forces the output of inverter 216 high thereby forcing the output of gate 219 low. The low from output 53 of comparator 52, through inverter 204, forces the output of gate 177 low. The low from gate 177 and the low from gate 219 drive the output of gate 209 high thereby resetting latch 208. As will be seen further hereinafter, signal 352 from logic 320 is low. The low from signal 352 plus the low from latch 186 forces the output of gate 191 high to set latch 190. The low from run signal 166 forces the output of inverter 205 high, the output of gate 170 low, and the output of inverter 169 high. Since latch 190 is set, the high from inverter 169 and the high from latch 190 force the output of gate 168 low and the output of gate 167 high thereby forcing a ramp-1 off signal 113 high and selecting ramp-1 to comparator 52. As will be seen further hereinafter, corresponding ramp-2 off signal 114 from logic 270 and ramp-N off signal 115 from logic 320 are low and have no effect on comparator 52. Since ramp-1 is low, output 53 of comparator 52 is also forced low. The low from run signal 166 forces the output of gate 187 high thereby forcing the output of gate 211 and a corresponding ramp-1 on signal 110 low to deselect ramp-1 from comparator 50. As will be seen further hereinafter, a corresponding ramp-2 on signal 111, and a corresponding ramp-N on signal 112 are also forced low to deselect ramp-2 and ramp-N from comparator 50. The inverting input of comparator 50 is formed to float low with no input, thus, output 51 of comparator 50 is forced high.

Since logic 165 initializes signal 183 low similar to signal 352, logic 270 is initialized in a manner similar to logic 165. Thus, latches 277, 292, 294, 296, 298, and 309 are initialized in a manner similar to respective latches 208, 175, 180, 186, 190, and 203. Consequently, token signal 290 is also low. However, notice that the low from PWM latch 309 forces the output of gate 281 high and that the low from token signal 183 forces the output of gate 271 high thereby forcing the output of gate 272 and ramp-2 off signal 114 low. Logic 320 is initialized in a similar manner since run signal 166 is low. Thus, latches 328, 341, 339, 349, 350, and 363 are initialized in a similar manner to respective latches 208, 175, 180, 186, 190, and 203. As a result, token signal 352 is low in a manner similar to token signal 183. Additionally, ramp-N off signal 115 is initialized low similar to ramp-2 off signal 114.

At time T0, POR signal 316 goes low and forces CK-1 through CK-N low thereby releasing the ramp signals to start increasing. Note that the negative going edge of CK-1 functions as the negative going edge of the first pulse from CK-1 as clock 163 begins sequentially forming the non-overlapping clock signals. As explained hereinbefore, clock 163 is configured to inhibit the formation of clock signals after time T0 until it is time to generate the Nth clock signal in this first cycle of clock signals. The low from POR signal 316 forces the output of gate 210 high and the output of gate 178 low to remove the reset from latch 180. Since latch 180 is already reset, the low from gate 178 also forces the output of gate 179 high to set latch 180. Setting latch 180 forces token signal 183 high and the positive going edge passes an OFF-token to logic 270. The high output from latch 180 is coupled back to gate 179 but has no effect on latch 180 because the output of gate 178 remains low. The high from latch 180 also forces the output of inverter 181 low to remove the reset from latch 175.

Logic 270 functions similarly to logic 165 and forces token signal 290 high which passes an OFF-token to logic 320 and removes the reset from latch 292. In addition, because logic 270 received positive token signal 183, logic 270 forces the output of gate 271 low and the output of gate 272 high thereby forcing ramp-2 off signal 114 high to couple ramp-2 to comparator 52. Because run signal 166 is still low, logic 320 keeps token signal 352 low and keeps the reset applied to latch 341. However, logic 320 receives the positive going token signal 290 from logic 270 thereby forcing the output of gate 323 low and the output of gate 322 and the corresponding ramp-N off signal 115 high. Since all of ramp off signals 113, 114, and 115 are high, all of the ramp signals are connected to the input of comparator 52. Also note that all of the ramp signals are substantially increasing at a similar rate and forming substantially similar signals.

At a time T1, ramp-1 crosses the off-error signal from the output of amplifier 39 forcing output 53 high. The high from comparator 52 has no effect on logic 165 because run signal 166 is low and prevents latch 190 from being reset which prevents a pulse on token signal 183. Note that CK-2 is inhibited as illustrated by plot 249 and described previously hereinbefore. Because logic 270 has an OFF-token, logic 270 responds to the high from comparator 52. Token signal 183 is high and latch 298 is set, thus, the high from output 53 of comparator 52 forces the output of gate 301 low and signal 183 forces the output of inverter 300 low to assist in driving the output of gate 302 high and resetting latch 298. The low from latch 298 forces the output of gate 271 high. Because PWM latch 309 is low and is forcing the output of gate 281 high, the high from gate 271 forces the output of gate 272 low thereby forcing ramp-2 off signal 114 low and disconnecting ramp-2 from comparator 52. The high from comparator 52 also resets latch 350 of logic 320 and forces the output of gate 322 low to force ramp-N off signal 115 low and remove ramp-N from comparator 52. Consequently, Mux 49 is controlled only by logic 165 and only ramp-1 is connected to comparator 52. The high from output 53 of comparator 52 also causes latch 292 to be set through gate 288. However, latch 341 of logic 320 is not set by the high from output 53 because latch 341 is held reset by run signal 166 which is holding latch 339 reset.

At a time T2, clock 163 generates the Nth clock in the first cycle of clock signals thereby releasing the outputs of clock 163 to couple all the clock signals to the remainder of section 160. The CK-N signal goes high as illustrated by plot 250 and discharges ramp-N. CK-N subsequently goes low to release ramp-N to begin charging.

At a time T3, CK-1 again goes high and discharges ramp-1. The discharging of ramp-1 forces comparator 52 low. The high from CK-1 resets latch 186 and the low from comparator 52 has no further effect on logic 165. However, since token signal 183 is high, the low from output 53 forces the output of inverter 310 high which, along with the high from latch 292, forces the output of gate 289 low and the output of gate 291 high. The high from gate 291 resets latch 294 thereby forcing token signal 290 low. The low from latch 294 resets latch 292 through inverter 295. Resetting latch 292 forces the output of gate 291 low which again sets latch 294 through gate 293 and again forces token signal 290 high. Logic 320 receives the negative going edge of token signal 290. Because latch 349 is already reset, the low from signal 290 forces the output of gate 354 high and sets latch 350. Thus, logic 320 now has an ON-token.

At a time T4, CK-2 goes high and resets ramp-2. Subsequently, CK-2 goes high and releases ramp-2 to begin charging. The CK-2 signal has no effect on logic 165 and logic 320. However, CK-2 resets latch 296 of logic 270. Ramp-1 continues to charge and eventually crosses the off-error signal from amplifier 39 at a time T5 thereby forcing output 53 of comparator 52 high. The high from output 53 has no effect on logic 165 or logic 270. Because token signal 290 is high, the high from output 53 resets latch 350 through gates 356 and 355.

At a time T6, CK-N goes high and resets ramp-N. Subsequently, CK-N goes low and releases ramp-N to begin charging. CK-N has no effect on logic 165, 270, or 320.

At a time T7, CK-1 again goes high and resets ramp-1 thereby forcing the output 53 of comparator 52 low. Subsequently, CK-1 goes low and releases ramp-1 to begin charging. The low from CK-1 also is a signal to run 305 that the initialization sequence of section 160 is complete and run signal 166 goes high.

Thus, controller 158 is now operating in the normal operation mode. Run signal 166 going high forces the output of latch 339 high and releases logic 320 to change the state of token signal 352. The high from CK-1 ensures that latches 186 and 203 of logic 165 are reset. Because latch 190 is set, the high from run signal 166 forces the output of gate 187 low. The high run signal also forces the output of inverter 205 low. The low from gate 187 and latch 203 forces the output of gate 211 and ramp-1 on signal 110 high to couple ramp-1 to the input of comparator 50. Subsequently, clock 163 will sequentially generate CK-2 through CK-N signals and reset the ramp signals for use by logics 165, 270, and 320. However, the ON-token and OFF-tokens are used to select which of logics 165, 270, and 320 will use the comparator outputs to control the PWM signals.

Section 160 is now operating in the normal operating mode and is initialized to regulate the value of the output voltage. As ramp-1 continues to increase, section 160 responds to the value of the feedback signal which affects the subsequent operation of section 160. Assuming that the output voltage is high so that the off-error amplifier signal is lower than the on-error amplifier signal, ramp-1 continues to increase until it crosses the off-error amplifier signal and forces output 53 of comparator 52 high at a time T8.

At time T8, the high from output 53 forces the output of inverter 204 low which sets latch 175 through gate 174 and forces the output of gate 193 low which resets latch 190 through gate 192. Note that the other input of gate 192 is low because both token signal 352 and run signal 166 are high. Resetting latch 190 forces the output of gate 187 high thereby forcing the output of gate 211 and corresponding ramp-1 on signal 110 low to decouple ramp-1 from comparator 50. Resetting latch 190 also causes a delayed low at the output of D2 184 forcing the set input of latch 175 low, through gates 173 and 174, and forcing the output of gate 168 high which is coupled to gate 167. Since the other input of gate 167 is forced high due to latch 203 being reset, the output of gate 167 and corresponding ramp-1 off signal 113 is forced low and decouples ramp-1 from comparator 52. Decoupling ramp-1 from comparator 52 causes the input of comparator 52 to float low and force output 53 low. The low from output 53 forces the output of inverter 204 high which then allows latch 180 to be reset through gates 176 and 178. Resetting latch 180 forces token signal 183 low and passes the ON-token to logic 270. Logic 270 receives the low from token signal 183 which forces the output of gate 297 high and sets latch 298 in order to latch the ON-token into logic 270. Resetting latch 180 also resets latch 175 through inverter 181. Resetting latch 175 forces the output of gate 176 high and again sets latch 180 to force token signal 183 high thereby passing the OFF-token to logic 270. Consequently, logic 165 has passed the ON-token and the OFF-token to logic 270 without setting latch 203, thus, without generating a PWM1 control signal.

Because logic 270 now has the ON-token and the OFF-token, logic 270 remains in this state until the output of either comparator 50 or comparator 52 changes states and forces logic 270 to react in a manner as just discussed for logic 165. As long as the output voltage remains high, this sequence continues for each logic block of controller 158.

For the opposite case if the output voltage is too low instead of high, the off-error amplifier signal is higher than the on-error amplifier signal so that the ramp signals cross the on-error amplifier signal before crossing the off-error amplifier signal. Thus, ramp-1 crosses the on-error amplifier signal forcing output 51 of comparator 50 low. The low from output 51 forces the output of gate 201 high to set latch 203. Note that the output of gate 187 is low which facilitates the output of gate 201 going high. Setting latch 203 forces the PWM1 control signal high to assist in regulating the output voltage of system 155. Since token signal 352 is high, setting latch 203 also resets latch 190 through gates 193 and 192. Setting latch 203 also forces the output of inverter 216 low through DE 213, the output of gate 219 high, and the output of gate 209 low to remove the reset from latch 208. Setting latch 203 also forces the output of gate 211 and corresponding ramp-1 on signal 110 low which decouples ramp-1 from comparator 50. Decoupling ramp-1 from comparator 50 forces output 51 of comparator 50 high. The high from output 51 forces the output of gate 171 low which sets latch 208 through gate 207. The high from latch 208 forces the output of gate 210 low, and the output of gate 178 high, which resets latch 180. Resetting latch 180 forces token signal 183 low and passes the ON-token to logic 270. The low from signal 183 sets latch 298 to latch the ON-token and enables gates 299 and 279 to couple ramp-2 to comparator 50. Latch 180 stays reset until output 53 of comparator 52 goes high. It should be noted that since the ON-token is passed to logic 270, logic 270 is enabled to respond to output 51 of comparator 50. Thus, if the output voltage remains low, logic 270 may be enabled to generate a PWM2 control signal and overlap at least a portion of the time that the PWM1 control signal from logic 165 is asserted. The generation of the PWM2 control signal will pass the ON-token to logic 320 which may also generate a PWMN control signal. Thus, multiple PWM control signals may be asserted simultaneously.

Ramp-1 continues to increase until crossing the off-error amplifier signal which forces output 53 of comparator 52 high. The high from output 53 resets latch 203 by forcing the output of gate 200 low and the output of gate 202 high. Note that latch 190 was already reset which forced the output of gate 195 high. The low from latch 203 forces the PWM1 control signal low. The low from latch 203 also is delayed by DE 213 and forces the output of inverter 216 high. Since the output of latch 180 is low, the output of gate 217 is high which forces the output of gate 219 to go low. The low from latch 203 also drives the output of gate 212 high and the output of gate 167 and corresponding ramp-1 off signal 113 low thereby decoupling ramp-1 from comparator 52. Decoupling ramp-1 from comparator 52 forces output 53 of comparator 52 low. When output 53 goes low the output of inverter 204 goes high and gate 177 goes low and the output of gate 209 goes high to reset latch 208. Resetting latch 208 forces the output of gate 210 high, the output of gate 178 low, and the output of gate 179 high to set latch 180. Setting latch 180 forces token signal 183 high again to pass the OFF-token to logic 270. If PWM latch 309 is reset, the high from token signal 183 and the high from latch 298 forces ramp-2 off signal 114 high, through gates 271 and 272, to couple ramp-2 to the input of comparator 52. If PWM latch 309 is set, token signal 183 going high resets latch 298 which forces the output of gate 299 high. The high from gate 299 plus the output of latch 309 forces ramp-2 off signal 114 high through gates 272 and 281. The negation of the PWM control signals for each logic block in response to the corresponding ramp signal crossing the off-error signal will continue for each logic block.

In order to facilitate this functionality for controller 158, a first input of logic 165 is connected to receive run signal 166, a second input of logic 165 is connected to output 53 of comparator 52, a third input of logic 165 is connected to output 51 of comparator 50, a fourth input of logic 165 is connected to token signal 352, a fifth input of logic 165 is connected to clock signal CK-1, and a sixth input of logic 165 is connected to the output of POR 315 to receive POR signal 316. An input of inverter 205 is commonly connected to a first input of gate 223, a first input of gate 187, and connected to the first input of logic 165 to receive run signal 166. An output of inverter 205 is connected to a first input of gate 170. An input of inverter 204 is commonly connected to a first input of gate 200, a first input of gate 193, and a second input of logic 165 to receive the signal from output 53. A first input of gate 171 is commonly connected to a first input of gate 201 and the third input of logic 165 to receive the signal from output 51. A second input of gate 170 is commonly connected to a first input of gate 173, a second input of gate 223, a first input of gate 191, a first input of gate 194, and the fourth input of logic 165 to receive token signal 352. A first input of inverter 222 is commonly connected to the reset input of latch 186 and the fifth input of logic 165 to receive CK-1. An output of inverter 222 is connected to a first input of gate 202. A second input of gate 202 is connected to the output of gate 200 and the output of gate 202 is connected to the reset input of latch 203. The set input of latch 203 is connected to the output of gate 201. The Q output of latch 203 is commonly connected to a first output of logic 165 to form the PWM1 control signal, a second input of gate 194, a second input of gate 193, a first input of gate 212, and a first input of DE 213. An output of DE 213 is connected to an input of inverter 216 and to a first input of gate 211. A second input of gate 211 is commonly connected to a second input of gate 212, the output of gate 187, and a second input of gate 201. The output of gate 211 is connected to a second output of logic 165 in order to form ramp-1 on signal 110. An output of gate 212 is connected to a first input of gate 167. A second input of gate 167 is connected to the output of gate 168 and the output of gate 167 is connected to a third output of logic 165 in order to form ramp-1 off signal 113. A first input of gate 168 is connected to the output of inverter 169 which has an input connected to the output of gate 170. A second input of gate 168 is commonly connected to the input of inverter 172, a second input of gate 173, and an output of D2 184. An input of D2 184 is commonly connected to a second input of gate 187, the Q output of latch 190, and a first input of gate 195. A second input of gate 195 is connected to the output of gate 194. The output of gate 195 is connected to a second input of gate 200. A set input of latch 190 is connected to the output of gate 191 and a reset input of latch 190 is connected to the output of gate 192. A first input of gate 192 is connected to the output of gate 193 and a second input of gate 192 is connected to the output of gate 223. A second input of gate 191 is connected to the Q output of latch 186. The set input of latch 186 is commonly connected to the reset input of latch 180, the output of gate 178, and a first input of gate 179. The set input of latch 180 is connected to the output of gate 179. The Q output of latch 180 is commonly connected to an input of inverter 181, the fourth output of logic 165 in order to generate token signal 183, an input of DE 218, and a first input of gate 217. The output of DE 218 is connected to a second input of gate 179. The output of gate 217 is connected to a first input of gate 219 and a second input of gate 219 is connected to the output of inverter 216. The output of gate 219 is commonly connected to a second input of gate 217 and a first input of gate 209. The output of gate 209 is connected to the reset input of latch 208. A second input of gate 209 is connected to the output of gate 177. A first input of gate 177 is connected to the output of gate 210 and a first input of gate 178. A second input of gate 177 is commonly connected to a first input of gate 176, a first input of gate 174, and the output of inverter 204. The output of gate 176 is connected to a second input of gate 178. A second input of gate 176 is connected to the Q output of latch 175. The set input of latch 175 is connected to the output of gate 174 and a second input of gate 174 is connected to the output of gate 173. The reset input of latch 175 is connected to the output of inverter 181. The output of inverter 172 is connected to a second input of gate 171. The output of gate 171 is commonly connected to a first input of gate 207 and a first input of D1 182. An output of D1 182 is connected to an input of inverter 206 which has an output connected to a second input of gate 207. The output of gate 207 is connected to the set input of latch 208. The Q output of latch 208 is connected to a first input of gate 210. A second input of gate 210 is connected to the fifth input of logic 165 to receive POR signal 316.

Figure 10:
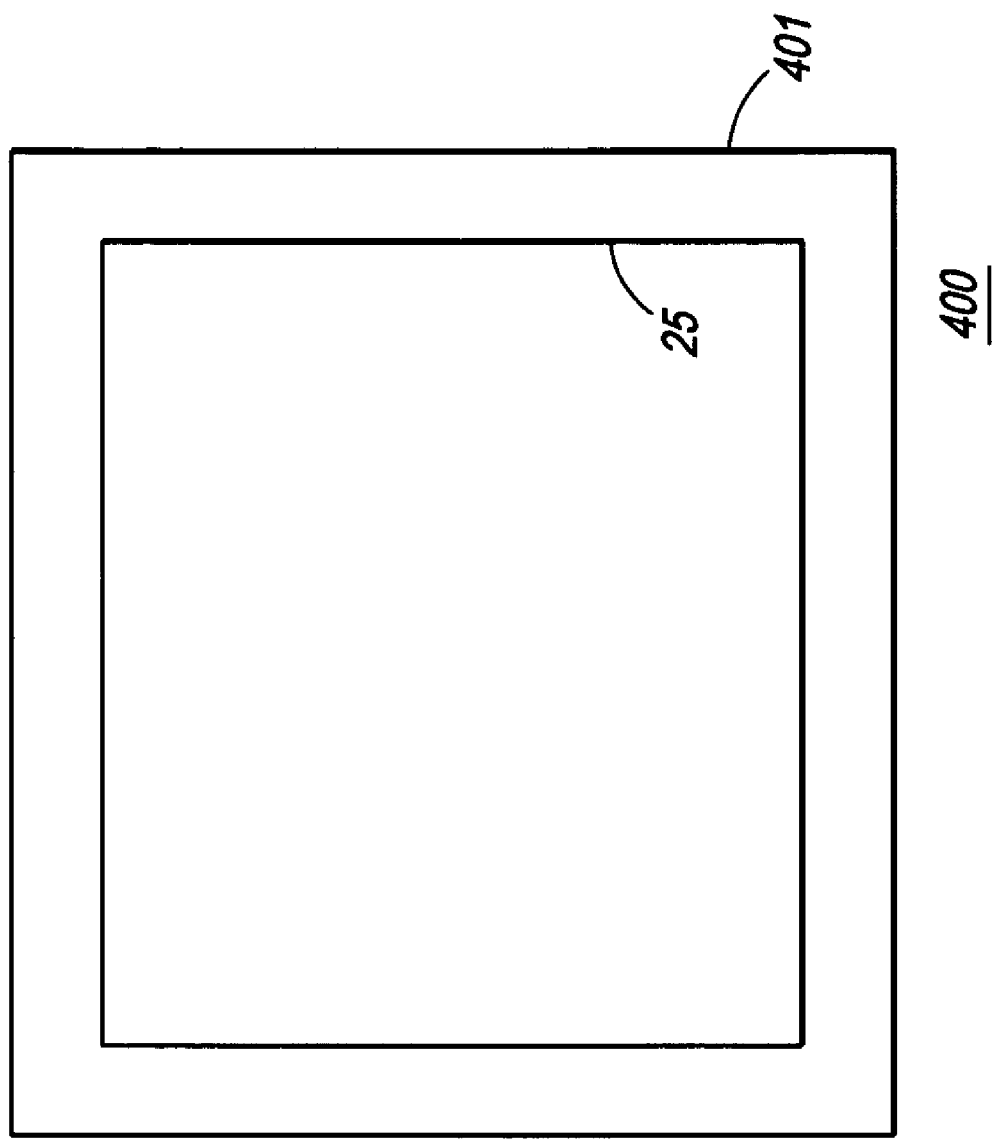
FIG. 10 illustrates an enlarged plan view of a semiconductor device that includes the power supply controller of FIG. 1 or FIG. 5 in accordance with the present invention.

FIG. 10 schematically illustrates an enlarged plan view of a portion of an embodiment of a semiconductor device 400 that is formed on a semiconductor die 401. Controller 25 is formed on die 401. Die 401 may also include other circuits that are not shown in FIG. 10 for simplicity of the drawing. Controller 25 and device 401 are formed on die 401 by semiconductor manufacturing techniques that are well known to those skilled in the art. In other embodiments, controller 158 may be formed on die 401 instead of controller 25.

In view of all of the above, it is evident that a novel device and method is disclosed. Included, among other features, is forming a multi-phase PWM controller that uses a plurality of ramp signals to form a plurality of PWM control signals. The same error amplifier and the same PWM comparators are used for all PWM control channels. Using the same error amplifier and the same PWM comparators for all of the channels minimizes offset errors thereby improving the accuracy of the PWM controller. Minimizing the offsets more equally distributes the load current between each of the PWM phases and facilitates using smaller power switches and smaller passive components which reduces the cost of the switches and passive components thereby reducing the system costs.

While the subject matter of the invention is described with specific preferred embodiments, it is evident that many alternatives and variations will be apparent to those skilled in the semiconductor arts. For example, the logic blocks of the PWM channels are illustrated with a preferred logic implementation, however, various other logic combinations may be used to implement the functionality of using the same error amplifier and the same comparator(s) for each channel while using a plurality of ramp signals to form the plurality of PWM control signals. Although a differential amplifier is illustrated to form the first and second error signals, other well known error amplifier circuits may be used to form the two error signals. The exemplary embodiments illustrate circuits to control an output voltage, however, a current or power may also be controlled in addition to or instead of the voltage. Additionally, the word "connected" is used throughout for clarity of the description, however, it is intended to have the same meaning as the word "coupled". Accordingly, "connected" should be interpreted as including either a direct connection or an indirect connection.

The invention claimed is:

1. A method of forming a power controller comprising:
configuring the power controller to form a plurality of PWM control signals to control an output voltage formed by the power controller;
configuring the power controller to receive a feedback signal that is representative of a value of the output voltage and responsively form a first error signal that is representative of a deviation of the output voltage from a desired value of the output voltage;
configuring a first PWM control block of the power controller to selectively use the first error signal to control a first PWM control signal of the plurality of PWM control signals for a first time period; and
configuring a second PWM control block of the power controller to selectively use the first error signal to control a second PWM control signal of the plurality of PWM control signals for a second time period.

2. The method of claim 1 wherein configuring the first PWM control block of the power controller to selectively use the first error signal to control the first PWM control signal includes configuring the first PWM control block to use the first error signal to set a first operating state wherein the first PWM control block asserts the first PWM control signal.

3. The method of claim 2 further including configuring the power controller to receive the feedback signal and responsively form a second error signal and configuring the first PWM control block to selectively use the second error signal to set a second operating state of the first PWM control block wherein the first PWM control block negates the first PWM control signal.

4. The method of claim 3 wherein configuring the first PWM control block to use the first error signal to set the first operating state wherein the first PWM control block asserts the first PWM control signal includes configuring the first PWM control block to selectively couple a first ramp signal to a first comparator for the first time period and use a signal from the first comparator to set the first operating state.

5. The method of claim 4 wherein configuring the first PWM control block to selectively use the second error signal to set the second operating state includes configuring the first PWM control block to selectively couple the first ramp signal to a second comparator and use a signal from the second comparator to control the second operating state.

6. The method of claim 5 wherein configuring the second PWM control block of the power controller to selectively use the first error signal to control the second PWM control signal includes configuring the second PWM control block to selectively couple a second ramp signal to the first comparator for the second time period and use the signal from the first comparator to control a first state of the second PWM control signal.

7. The method of claim 6 further including configuring the second PWM control block to selectively couple the second ramp signal to a second comparator and use the signal from the second comparator to control a second state of the second PWM control signal.

8. The method of claim 1 further including configuring the power controller to form the second time period with a portion of the first time period overlapping a portion of the second time period.

9. The method of claim 1 wherein configuring the first PWM control block of the power controller to selectively use the first error signal and configuring the second PWM control block of the power controller to selectively use the first error signal includes configuring the first PWM control block to use the first error signal to set a first state of the first PWM control signal and configuring the second PWM control block to use the first error signal to set a first state of the second PWM control signal and further including configuring the power controller to receive the feedback signal and responsively form a second error signal and configuring the first PWM control block and the second PWM control block to use the second error signal to set a second state of the respective first PWM control signal and second PWM control signal.

10. The method of claim 9 further including configuring a third PWM control block of the power controller to selectively use the first error signal to set a first state of a third PWM control signal of the plurality of PWM control signals and to use the second error signal to set a second state of the third PWM control signal.

11. A power supply controller comprising:

an error circuit coupled to receive a feedback signal and responsively form a first PWM modulator switching signal wherein the error circuit includes an error amplifier coupled to receive the feedback signal and form an error signal, and a first comparator coupled to receive the error signal and form the first PWM modulator switching signal, and wherein the error circuit is coupled to receive the feedback signal and form a second PWM modulator switching signal; and a plurality of PWM control blocks with each PWM control block configured to use the first PWM modulator switching signal and the second PWM modulator switching signal to form a PWM control signal.

12. The power supply controller of claim 11 wherein the power supply controller includes a ramp generator configured to generate a plurality of ramp signals including a separate ramp signal for each PWM control block and wherein each PWM control block is configured to selectively couple the separate ramp signal for a respective PWM control block to the first comparator and selectively couple the separate ramp signal for the respective PWM control block to a second comparator.

13. The power supply controller of claim 12 wherein an output of the first comparator is used to set a first state of a PWM control block that is selectively coupling the separate ramp signal for that PWM control block to the first comparator and wherein an output of the second comparator is used to set a second state of the PWM control block that is selectively coupling the separate ramp signal for that PWM control block to the second comparator.

14. The power supply controller of claim 11 wherein the plurality of PWM control blocks includes at least three PWM control blocks.

15. A power supply controller comprising:

an error circuit coupled to receive a feedback signal and responsively form first and second PWM modulator signals;

a first PWM control block configured to use the first PWM modulator signal during a first time period to set a first operating state of the first PWM control block and to use the second PWM modulator signal to set a second operating state of the first PWM control block; and a second PWM control block configured to use the first PWM modulator signal during a second time period to set a first operating state of the second PWM control block and to use the second PWM modulator signal to set a second operating state of the second PWM control block.

16. The power supply controller of claim 15 further including a first comparator, a second comparator, and a ramp generator configured to form a plurality of ramp signals wherein the first PWM control block selectively couples a first ramp signal to the first comparator to set the first operating state of the first PWM control block and couples the first ramp signal to the second comparator to set the second operating state of the first PWM control block.

17. The power supply controller of claim 16 further including the second PWM control block configured to selectively couple a second ramp signal to the first comparator to set the first operating state of the second PWM control block and couple the second ramp signal to the second comparator to set the second operating state of the second PWM control block.

18. The power supply controller of claim 15 wherein a ramp generator forms a separate ramp signal for the first PWM control block and the second PWM control block.

\* \* \* \* \*